(12) United States Patent
Nakano et al.

(10) Patent No.: US 8,939,742 B2
(45) Date of Patent: Jan. 27, 2015

(54) COMPRESSOR WITH STEEL AND CAST IRON SLIDING MATERIALS

(75) Inventors: Masao Nakano, Shiga (JP); Noboru Iida, Shiga (JP); Tsuyoshi Karino, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 329 days.

(21) Appl. No.: 13/378,609

(22) PCT Filed: Jun. 16, 2010

(86) PCT No.: PCT/JP2010/060594
§ 371 (c)(1),
(2), (4) Date: Dec. 15, 2011

(87) PCT Pub. No.: WO2010/147235
PCT Pub. Date: Dec. 23, 2010

(65) Prior Publication Data
US 2012/0087822 A1 Apr. 12, 2012

(30) Foreign Application Priority Data

Jun. 19, 2009 (JP) .................................. 2009-146220

(51) Int. Cl.
*F01C 21/00* (2006.01)
*F03C 2/00* (2006.01)
(Continued)

(52) U.S. Cl.
CPC ............. *C09K 5/045* (2013.01); *F01C 21/0809* (2013.01); *F04C 18/3564* (2013.01);
(Continued)

(58) Field of Classification Search
CPC .... F04C 23/001; F04C 23/008; F04C 18/324; F04C 18/3564; F04C 2210/26; F04C 2210/263; F01C 21/08; F01C 21/0809
USPC ......................... 418/60, 63–65, 178–179, 270
See application file for complete search history.

(56) References Cited

U.S. PATENT DOCUMENTS 5,548,973 A 8/1996 Komine et al.
6,651,458 B1 * 11/2003 Ebara et al. ..................... 62/510
(Continued)

FOREIGN PATENT DOCUMENTS

CN 1118842 3/1996
CN 1316590 10/2001
(Continued)

OTHER PUBLICATIONS

Calm. "The next generation of refrigerants—Historical review, considerations, and outlook". *International Journal of Refrigeration*, vol. 31, No. 7 (2008) 1123-1133.
(Continued)

*Primary Examiner* — Theresa Trieu
(74) *Attorney, Agent, or Firm* — Hamre, Schumann, Mueller & Larson, P.C.

(57) ABSTRACT

A compressor, characterized in that a steel is used as the base material for the other sliding material vane 10 and nitrided, a CrN or DLC film is formed on the surface by PVD treatment, and a Ni—Cr—Mo cast iron is used for the other corresponding sliding material piston 9. It is possible in such a configuration to suppress the temperature rise by sliding friction of the sliding materials, such as the vane tip region 10*a* and the peripheral region of piston 9 that are vigorously slid, relax decomposition of the refrigerant, and suppress corrosion by hydrogen fluoride generated in reaction with water and oxygen, and thus to provide a compressor higher in reliability.

14 Claims, 5 Drawing Sheets

(51) Int. Cl.
*F03C 4/00* (2006.01)
*F04C 2/00* (2006.01)
*C09K 5/04* (2006.01)
*F01C 21/08* (2006.01)
*F04C 18/356* (2006.01)
*F04C 23/00* (2006.01)
*F25B 31/00* (2006.01)

(52) U.S. Cl.
CPC ......... *F04C23/008* (2013.01); *C09K 2205/126* (2013.01); *C09K 2205/22* (2013.01); *F04C 2210/26* (2013.01); *F04C 2210/263* (2013.01); *F04C 2230/91* (2013.01); *F25B 31/002* (2013.01)
USPC ................ 418/178; 418/60; 418/63; 418/179

(56) References Cited

U.S. PATENT DOCUMENTS

| | | |
|---|---|---|
| 6,656,891 B1 | 12/2003 | Sakanoue et al. |
| 2003/0220207 A1 | 11/2003 | Akiyama et al. |
| 2005/0233934 A1 | 10/2005 | Singh et al. |
| 2006/0078440 A1 | 4/2006 | Nishikawa et al. |
| 2007/0007488 A1* | 1/2007 | Singh et al. ..................... 252/68 |
| 2007/0261238 A1 | 11/2007 | Sato et al. |
| 2008/0240955 A1 | 10/2008 | Takeuchi et al. |
| 2012/0128519 A1* | 5/2012 | Nakano et al. .................. 418/63 |

FOREIGN PATENT DOCUMENTS

| | | |
|---|---|---|
| CN | 1400329 | 3/2003 |
| CN | 1469053 | 1/2004 |
| CN | 1500855 | 6/2004 |
| CN | 1898353 | 1/2007 |
| EP | 1 209 361 | 5/2002 |
| JP | S 57-8388 | 1/1982 |
| JP | 11-236890 | 8/1999 |
| JP | 2001-099502 | 4/2001 |
| JP | 2005-155461 | 6/2005 |
| WO | WO 92/18772 | 10/1992 |
| WO | WO 2005/042663 | 5/2005 |

OTHER PUBLICATIONS

Kamminga et al.: "First results on duplex coatings without intermediate mechanical treatment"; Surface and Coatings Technology, Jan. 1, 2003, pp. 671-676.

Leck. "Evaluation of HFO-1234yf as a Potential Replacement for R-134a in Refrigeration Applications", 3rd IIR Conference on Thermophysical Properties and Transfer Processes of Refrigerants, Boulder, CO, 2009.

* cited by examiner

Fig. 4

| Blending ratio (wt%) | | Global warming potential of a 2-component mixed refrigerant | |
|---|---|---|---|
| HFO 1234yf | HFC | HFO1234yf +HFC32 | HFO1234yf +HFC125 |
| 0 | 100 | 675 | 3500 |
| 10 | 90 | 608 | 3150 |
| 20 | 80 | 541 | 2801 |
| 30 | 70 | 474 | 2451 |
| 40 | 60 | 407 | 2102 |
| 50 | 50 | 340 | 1752 |
| 56 | 44 | 299 | 1542 |
| 60 | 40 | 272 | 1402 |
| 70 | 30 | 205 | 1053 |
| 78.7 | 21.3 | 147 | 749 |
| 80 | 20 | 138 | 703 |
| 90 | 10 | 71 | 354 |
| 91.6 | 8.4 | 60 | 298 |
| 100 | 0 | 4 | 4 |

COMPRESSOR WITH STEEL AND CAST IRON SLIDING MATERIALS

TECHNICAL FIELD

The present invention relates to improvement in reliability of compressors incorporated in refrigeration cycle systems, such as room air conditioners, refrigerators, other air conditioning apparatuses, which use a refrigerant mainly containing a chlorine atom-free, low-global warming potential hydrofluoroolefin having a carbon-carbon double bond as the operating refrigerant.

BACKGROUND ART

HFC (hydrofluorocarbon) systems, which have zero ozone depletion potential, are used increasingly as the operating refrigerants for conventional refrigeration apparatuses, but on the other hand, the HFC-based refrigerants, which have very high global warming potentials, are causing problems recently. Thus, under study are refrigeration apparatuses that use a refrigerant mainly containing a chlorine atom-free low-global warming potential hydrofluoroolefin having a carbon-carbon double bond. Various studies are made on the sliding materials used in these kinds of compressors employing the conventional HFC-based refrigerants, such as vanes and pistons in rotary compressors, for assure reliability (see, for example, Patent Document 1).

FIG. 5 is a horizontal cross-sectional view illustrating the rotary compressor used with a conventional HFC (hydrofluorocarbon)-based refrigerant described in Patent Document 1. In the configuration, a piston 33, which is inserted along the internal surface of a cylinder 31, rotates by rotation of the shaft 32, suctioning and compressing a refrigerant gas respectively in a suction chamber and a compression chamber partitioned by a vane 34. The region of the rotary compressor severely damaged by abrasion in the mechanical configuration above is the area where the tip of the vane 34 and the peripheral surface of the piston 33 are in contact with each other, and it is a boundary lubrication region where the tip of the vane 34 is pressed onto the peripheral surface of the piston 33 by large force from the back face of the vane 34 because of the pressure difference between discharge and suction pressures.

For that reason, the vane is subjected to nitridation treatment or the surface thereof to CrN or TiN ion plating, for improvement in abrasion resistance to assure reliability.

CITATION LIST

Patent Document 1: JP-A No. 11-236890

SUMMARY OF INVENTION

Technical Problem

However, when considering the compressor for a refrigeration apparatus employing a refrigerant mainly containing a chlorine atom-free low-global warming potential hydrofluoroolefin having a carbon-carbon double bond as the operating refrigerant, there was a problem that, when the refrigerant above reacts with water and oxygen, hydrogen fluoride is generated and it leads to acceleration of corrosion of the sliding materials, in particular the vane and the piston which are exposed to particularly severe sliding force and to degradation of the refrigeration oil and thus deterioration in reliability.

An object of the present invention, which was made to solve the problems associated with conventional technology, is to suppress severe sliding, reduce the amount of hydrofluoric acid generated by decomposition of the refrigerant and thus assure reliability.

Solution to Problem

The invention according to the present invention, which was made to achieve the object, is a compressor characterized in that: a refrigerant containing a hydrofluoroolefin having a carbon-carbon double bond as the base component is used as its operating refrigerant; a refrigeration oil miscible with the refrigerant is used; a steel is used as the base material such as vane for one sliding material in the compressing mechanism unit and nitrided; a CrN or DLC film is formed on the surface thereof by PVD treatment; and a Ni—Cr—Mo cast iron is used for the piston that is the other sliding material. It is possible in this way to suppress the temperature rise by sliding friction of sliding materials severely slid, such as vane tip region and piston peripheral region, relax decomposition of the refrigerant, and thereby to suppress corrosion by hydrogen fluoride that is generated when the refrigerant reacts with water and oxygen.

Advantageous Effects of Invention

According to the present invention, it is possible, by nitriding the sliding materials of a compressor and subjecting the surface thereof to PVD treatment, to control corrosion by hydrogen fluoride generated in reaction of the refrigerant mainly containing chlorine atom-free low-global warming potential hydrofluoroolefin having a carbon-carbon double bond with water and oxygen and thus to give a high-reliability compressor improved in abrasion resistance.

BRIEF DESCRIPTION OF DRAWINGS

FIG. 4 is a characteristic table showing the relationship between the blending ratio of a 2-component mixed refrigerant and the global warming potential.

DESCRIPTION OF EMBODIMENTS

Figure 1:
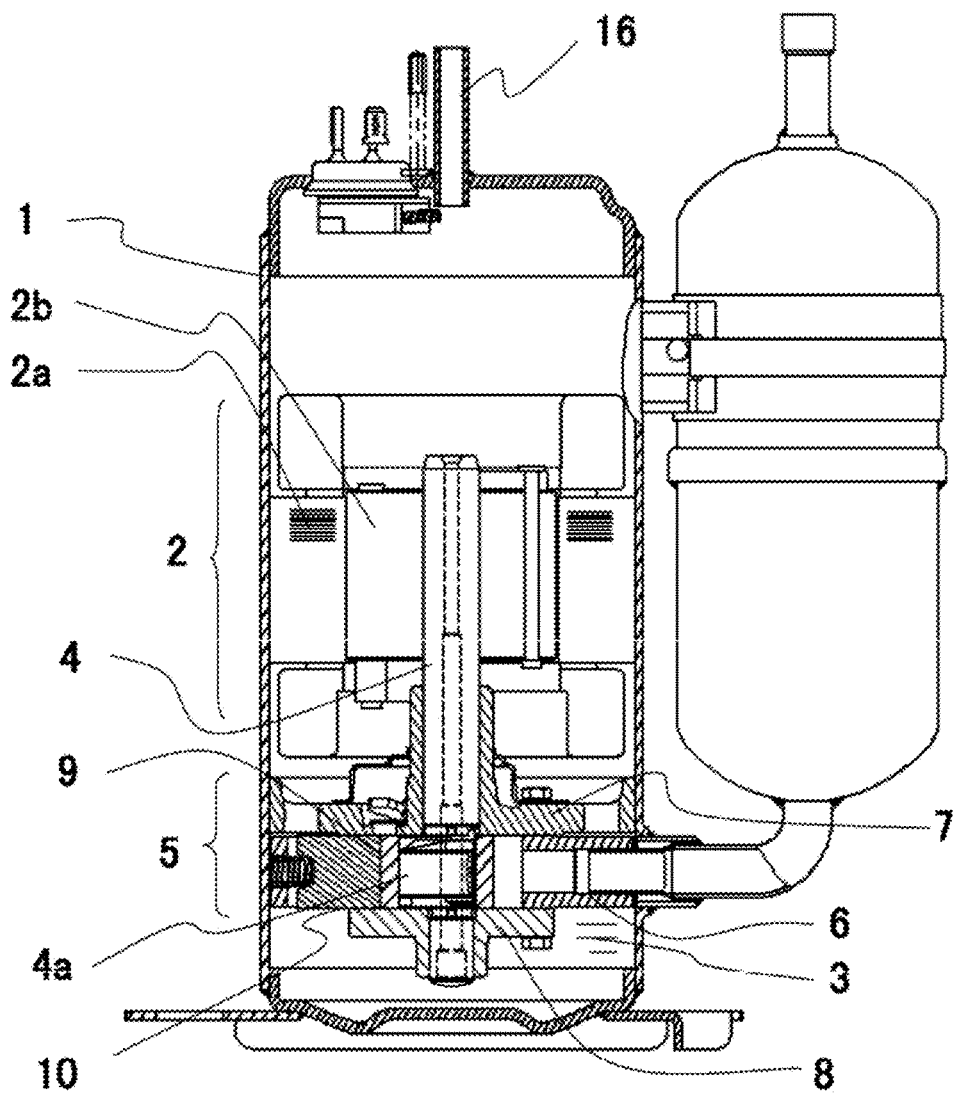
FIG. 1 is a vertical cross-sectional view illustrating the compressing mechanism unit of a rotary compressor in embodiment 1 of the present invention.

The compressor of the first invention is characterized in that: a refrigerant containing a hydrofluoroolefin having a carbon-carbon double bond as the base component is used as its operating refrigerant; a refrigeration oil miscible with the refrigerant is used; a steel is used as the base material for a sliding material in the compressing mechanism unit and nitrided; a CrN or DLC film is formed on the surface thereof by PVD treatment; and a Ni—Cr—Mo cast iron is used for the other sliding material. It is possible in this way to suppress the temperature rise, by sliding friction, of the sliding materials severely slid, relax decomposition of the refrigerant, and suppress corrosion by hydrogen fluoride that is generated when the refrigerant reacts with water and oxygen.

The compressor of the second invention is characterized in that: a refrigerant containing a hydrofluoroolefin having a carbon-carbon double bond as the base component is used as its operating refrigerant; a refrigeration oil miscible with the refrigerant is used; the compressing mechanism unit has a piston and a vane in a cylinder; a steel is used as the base material for the vane and nitrided; a CrN or DLC film is formed on the surface thereof by PVD treatment; and a Ni—Cr—Mo cast iron is used as the material for the piston. It is possible in this way to suppress the temperature rise by friction of the vane tip and piston peripheral regions severely slid, relax decomposition of the refrigerant, and suppress corrosion by hydrogen fluoride that is generated when the refrigerant reacts with water and oxygen.

The compressor of the third invention is characterized in that: a refrigerant containing a hydrofluoroolefin having a carbon-carbon double bond as the base component is used as its operating refrigerant; a refrigeration oil miscible with the refrigerant is used; a compressing mechanism unit having a motor in the tightly sealed container and a shaft driven by the motor is installed therein; the compressing mechanism unit has bearings at both terminal faces of the cylinder, a piston eccentrically rotated by the shaft in the cylinder and a vane dividing the cylinder to suction and compression chambers, the tip region of which is in contact with the peripheral surface of the piston under pressure; a steel is used as the base material for the vane and nitrided; a CrN or DLC film is formed on the surface thereof by PVD treatment; and a Ni—Cr—Mo cast iron is used as the material for the piston. It is possible in this way to suppress the temperature rise of the vane tip and piston peripheral regions, severely slid, relax decomposition of the refrigerant, and suppress corrosion by hydrogen fluoride that is generated when the refrigerant reacts with water and oxygen.

The compressor of the fourth invention is characterized in that the thickness of the CrN or DLC film formed on the tip region of the vane by PVD treatment in the second and third inventions is 5 to 15 μm. It is possible to assure reliability for an extended period of time even under severe sliding condition, because the thickness of the CrN or DLC film on the vane tip region is increased by PVD treatment.

The compressor of the fifth invention is characterized in that the film is formed only on the tip region of the vane by PVD treatment in any one of the second to fourth inventions. It is possible to reduce cost, by performing the high-cost PVD treatment only in the vane tip region most severely exposed to sliding in the sliding face.

The compressor of the sixth invention is characterized in that a mixed refrigerant containing a hydrofluoroolefin having a carbon-carbon double bond as the base component and a hydrofluorocarbon having no double bond is used as the operating refrigerant in the first to third inventions. It is possible in this way to improve particular properties such as refrigeration efficiency, compared to use of a single hydrofluoroolefin, and make it easier to use it as the operating refrigerant.

The compressor of the seventh invention is characterized in that: the hydrofluoroolefin is tetrafluoropropene (HFO1234yf); the hydrofluorocarbon is one or both of difluoromethane (HFC32) and pentafluoroethane (HFC125); and the refrigeration oil is a polyvinylether, a polyol ester or a polyalkylene glycol, in the sixth invention. It is possible in this way to use a mixed refrigerant having a low global warming potential (GWP), a low specific volume and high refrigeration efficiency as the operating refrigerant and to assure reliability of the compressor, because the refrigerant can be recovered easily by use of a refrigeration oil miscible with the refrigerant.

The compressor in the eighth invention is characterized in that the refrigeration oil contains no extreme pressure additive in any one of the first to third and seventh inventions. It is thus possible to prevent fast decomposition of the refrigerant in reaction of the extreme pressure additive contained in the refrigeration oil with the refrigerant.

Hereinafter, favorable embodiments of the present invention will be described with reference to drawings. It should be understood that the present invention will not be restricted by these embodiments.

Embodiment 1

FIG. 1 is a vertical cross-sectional view illustrating the rotary compressor in embodiment 1 of the present invention. As shown in FIG. 1, a stator 2a of a motor 2 is fixed in the upper region of a tightly sealed container 1 and a compressing mechanism unit 5 having a shaft 4 driven by a rotor 2b is fixed in the lower region of the tightly sealed container 1. A primary bearing 7 is fixed to the top of the cylinder 6 of the compressing mechanism unit 5 and a secondary bearing 8 to the bottom for example with bolts. In the cylinder 6, a piston 9 for eccentric rotation is inserted into the eccentric unit 4a of the shaft 4.

Stored at the bottom of the tightly sealed container 1 is a refrigeration oil 3 of non-extreme pressure additive-containing polyvinylether, polyol ester or polyalkylene glycol that is miscible with a single refrigerant of hydrofluoroolefin having a carbon-carbon double bond (for example, HFO1234yf) or a mixed refrigerant containing a hydrofluoroolefin as the base component and a hydrofluorocarbon having no double bond (for example, HFC32 or HFC125) (hereinafter, referred to as mixed refrigerant R, which also includes the single refrigerant).

Figure 2:
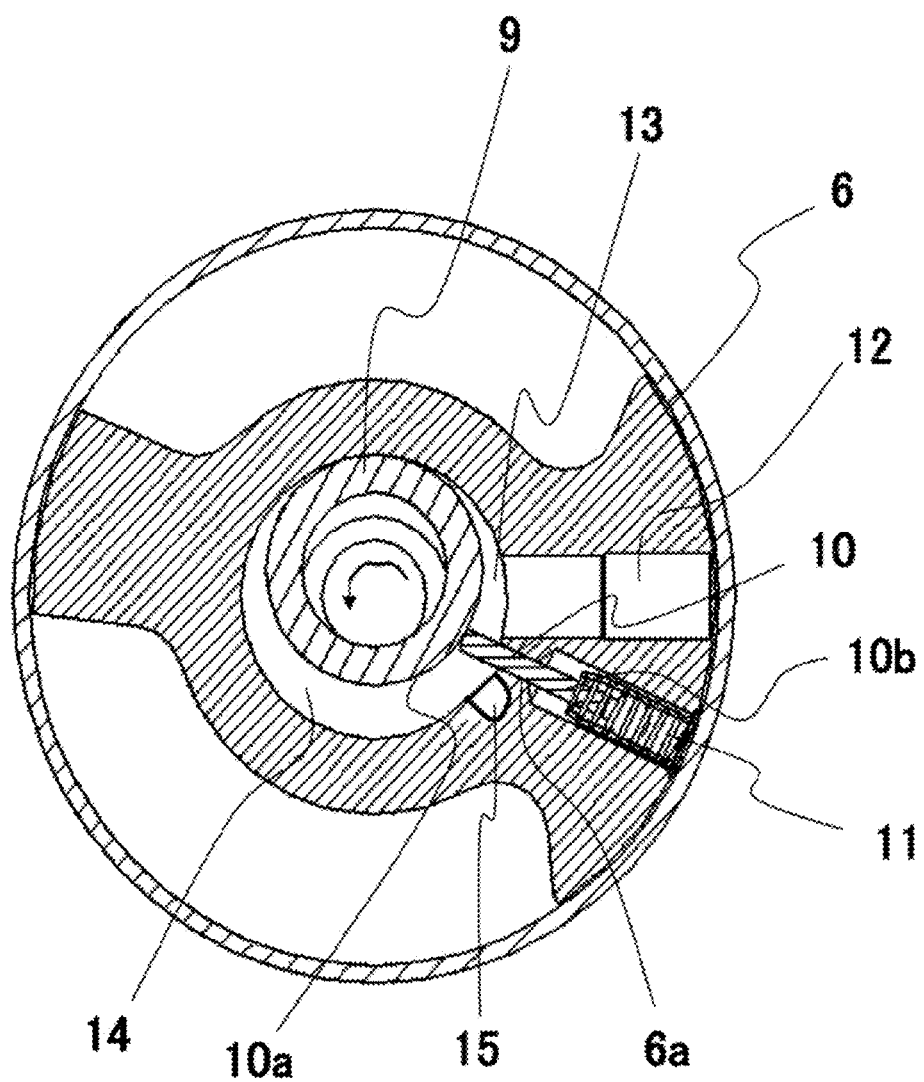
FIG. 2 is a horizontal cross-sectional view illustrating the compressing mechanism unit of the rotary compressor in embodiment 1 of the present invention.

FIG. 2 is horizontal cross-sectional view illustrating the compressing mechanism unit 5 of the rotary compressor according to the present invention. As shown in FIG. 2, a vane 10 is inserted into the vane slot 6a of the cylinder 6 and a vane spring 11 is placed on the rear face region 10b of the vane 10, so that the tip region 10a of the vane 10 becomes in contact with the peripheral surface of the piston 9. The base material for the vane 10, a steel such as SKH, SKD, SUS or SCM, is nitrided and a CrN or DLC film is formed on the surface of the tip region 10a of the vane 10 by PVD treatment. In addition, a Ni—Cr—Mo cast iron (containing Mo, Ni and Cr components) is used as the material for the piston 9.

Figure 3:
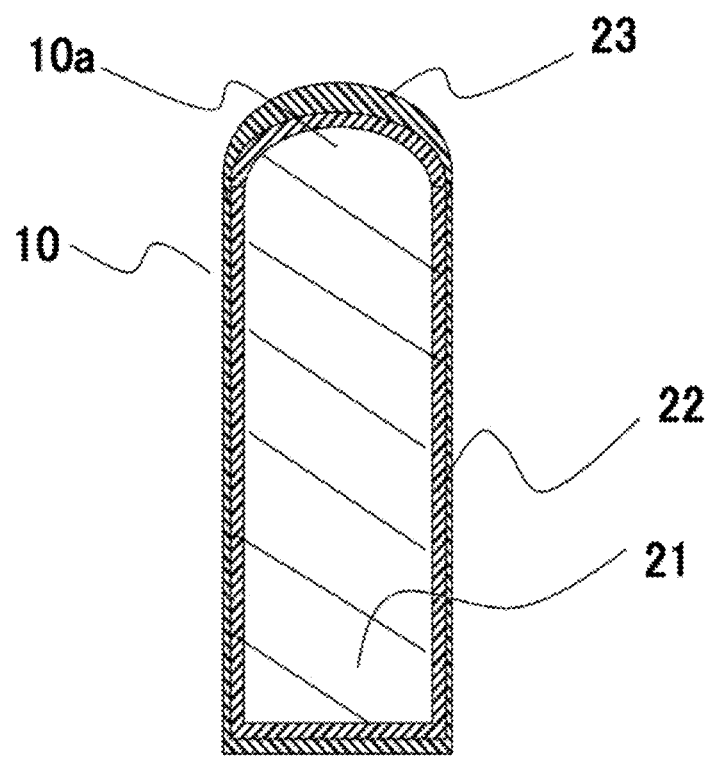
FIG. 3 is a horizontal cross-sectional view illustrating the vane of the rotary compressor in embodiment 1 of the present invention.
Figure 5:
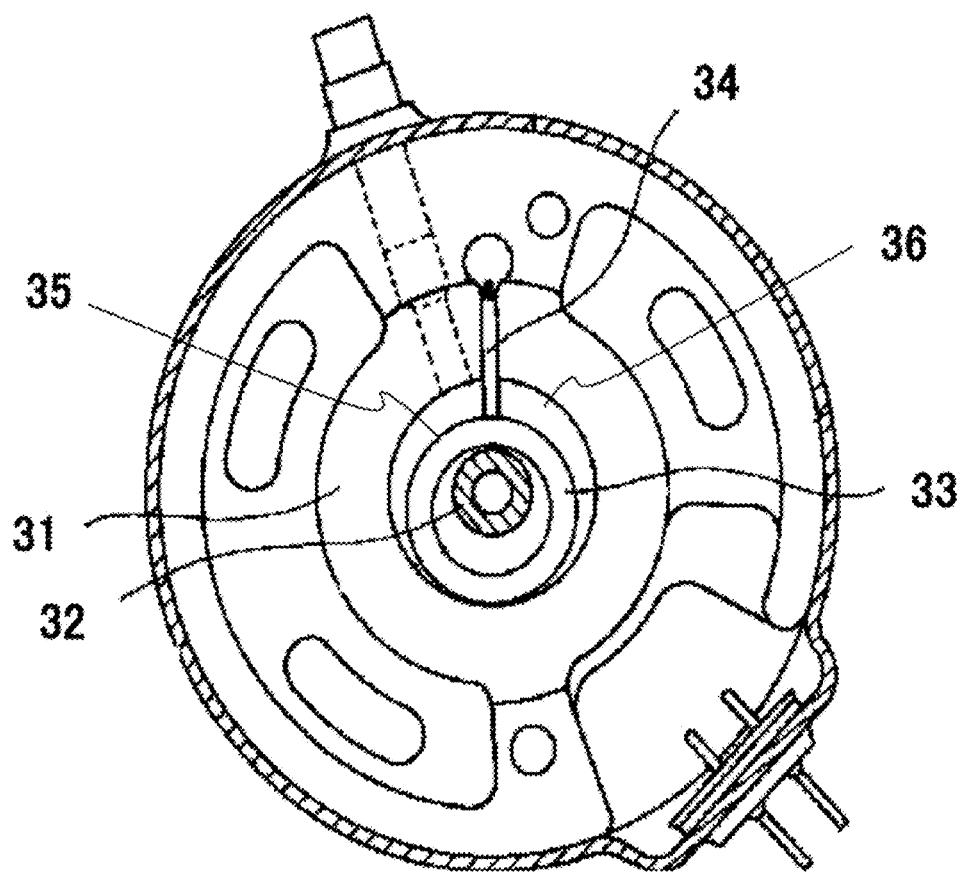
FIG. 5 is a horizontal cross-sectional view of the compressing mechanism unit of a conventional rotary compressor.

FIG. 3 is a horizontal cross-sectional view illustrating the vane 10. As shown in FIG. 3, a nitrided layer 22 is formed by nitriding treatment on the surface of the base material 21 of vane 10 and additionally, a CrN film 23 or a DLC film 23 is formed on the surface by PVD treatment. The PVD treatment is carried out in such a manner that the thickness of the CrN film 23 or the DLC film 23 in the tip region 10a, which is exposed to severe sliding, becomes 5 μm to 15 μm, which is larger than the normal film thickness of 1 μm to 5 μm obtained by common PVD treatment.

The mixed refrigerant R, the operating refrigerant used in the rotary compressor according to the embodiment 1, is a 2- or 3-component mixed refrigerant containing a tetrafluoropropene (HFO1234yf) as the base component and one or both of difluoromethane (HFC32) and pentafluoroethane (HFC125) mixed at a rate giving a global warming potential (GWP) of 5 or more and 750 or less, desirably 300 or less.

FIG. 4 is a characteristic table showing the relationship between the blending ratio of HFO1234yf to HFC32 or HFC125 in 2-component mixed refrigerants and the global warming potential. As shown in FIG. 4, it is needed to use HFO1234yf in an amount of 56 wt % or more to obtain a GWP of 300 or less, when HFO1234yf and HFC32 are mixed. Alternatively, it is needed to use HFO1234yf in an amount of 78.7 wt % or more to obtain a GWP of 750 or less, when HFO1234yf and HFC125 are mixed, and to use HFO1234yf in an amount of 91.6 wt % or more to obtain a GWP of 300 or less.

It is thus possible to make the adverse effect on global warming as small as possible, even if unrecovered refrigerant is discharged into air by any chance.

In addition, although the mixed refrigerant R mixed at the ratio shown in FIG. 4 is a non-azeotropic mixed refrigerant, the mixed refrigerant R allows reduction of the temperature difference and shows a behavior similar to a pseudo-azeotropic mixed refrigerant, and thus, improves the cooling performance and the cooling coefficient of performance (COP) of the refrigeration cycle apparatus.

When the operating refrigerant used is a single refrigerant of HFO1234yf, it has an extremely favorable GWP value of 4. However, it has a specific volume larger than that of the refrigerants mixed with hydrofluorocarbons, and thus, the refrigeration efficiency thereof becomes lower, demanding a larger refrigeration cycle apparatus. Thus, the rate of the HFO1234yf in the operating refrigerant, including the case of single refrigerant, is determined properly according to the purpose of the refrigeration cycle apparatus into which the compressor is introduced and the conditions such as the requirements on GWP described above.

Hereinafter, the operation and action of the rotary compressor in such a configuration above will be described. First, a refrigerant gas of mixed refrigerant R is suctioned into the suction chamber 13 through an inlet 12 formed in the cylinder 6. The refrigerant gas in the compression chamber 14 is compressed by leftward rotation (arrow direction) of the piston 9 and discharged through a discharge slot 15 out of an outlet (not shown in the Figure) into the tightly sealed container 1. The compressed refrigerant gas discharged into the tightly sealed container 1 is discharged through the opening surrounding the motor 2 out of a discharge pipe 16 at the top of the tightly sealed container 1, together with the refrigeration oil mist present there.

The pressure from the vane spring 11 and also the high discharge pressure are applied to the rear face region 10b of the vane 10 and also a significant force is applied to the piston by the pressure difference from the pressure in cylinder, and thus, the tip region 10a of the vane 10 and the peripheral surface of piston 9 are in contact with each other under boundary friction and placed in a severe environment at high temperature. The refrigerant gases in the mixed refrigerant R react with water and oxygen faster, generating hydrogen fluoride, in the high-temperature state, accelerating corrosion of the tip region 10a of vane 10 and the peripheral region of piston 9 under the severe environment at high temperature.

In the present invention, for assure reliability of the vane 10 and the piston 9 under the severe environment, a steel such as of SKH, SKD, SUS or SCM is used as the base material for the vane 10 and it is nitrided additionally, a CrN or DLC film is formed on the surface of the tip region 10a of the vane 10 by PVD treatment and a Ni—Cr—Mo cast iron (containing Mo, Ni and Cr components) is used as the material for the piston 9. It is thus possible to reduce the sliding resistance between the vane 10 and the piston 9 and the temperature rise by friction, and thus, to suppress generation of hydrogen fluoride and assure reliability of the sliding materials such as the vane 10.

In particular, as the thickness of the CrN or DLC film formed on the surface of the tip region 10a of vane 10 by PVD treatment is set to 5 μm to 15 μm, which is larger than the normal thickness of the film, it is possible to assure reliability thereof for an extended period of time, even under severe sliding condition.

It is also possible to obtain a less expensive vane, compared to the wide-range PVD treatment on the entire surface, because the expensive PVD treatment is performed only in the vane tip region 10a. It is also possible to suppress decomposition of the refrigerant itself, because the refrigeration oil contains no extreme pressure additive. Because a refrigeration oil miscible with the mixed refrigerant R of polyvinylether, polyol ester or polyalkylene glycol is used as the refrigeration oil, the refrigeration oil scattered in the refrigerating cycle can be recovered by the rotary compressor, giving a high-reliability rotary compressor.

The vane 10 and the piston 9, sliding materials of rolling piston-type rotary compressor, have been described in the embodiment 1 above, but the present invention is applicable similarly to other rotary compressors such as sliding vane-type compressor, scrolls of scroll compressor and other sliding materials such as shafts and bearings, for reduction of the sliding resistance and improvement in reliability when a mixed refrigerant R is used.

Also in the embodiment 1, a motor was installed in the tightly sealed container as the drive apparatus for compressing mechanism unit, but the configuration is not limited thereto, and the motor may be installed outside the tightly sealed container or the compressor may be driven by an engine.

INDUSTRIAL APPLICABILITY

As described above, the compressor according to the present invention, which shows assured reliability even under an environment where a mixed refrigerant containing a hydrofluoroolefin having a carbon-carbon double bond as the base component and a hydrofluorocarbon having no double bond is used, and is thus applicable, for example, in applications such as hot water heaters, car air conditioners, freezer refrigerators and dehumidifiers.

The invention claimed is:
1. A compressor, comprising:
 a compressing mechanism unit including:
  first and second sliding materials in sliding contact,
  the first sliding material including a nitrided steel as a base material;
  and a CrN or DLC film formed on a surface of the base material by PVD treatment; and
  the second sliding material including a Ni—Cr—Mo cast iron;
 wherein the compressor uses a refrigerant containing a hydrofluoroolefin having a carbon-carbon double bond as a base component as its operating refrigerant, and a refrigeration oil miscible with the refrigerant.
2. The compressor according to claim 1, wherein the operating refrigerant comprises a mixed refrigerant containing a hydrofluoroolefin having a carbon-carbon double bond as a base component and a hydrofluorocarbon having no double bond.

3. The compressor according to claim 2, wherein:
the hydrofluoroolefin is tetrafluoropropene (HFO1234yf);
the hydrofluorocarbon is one or both of difluoromethane (HFC32) and pentafluoroethane (HFC125); and
the refrigeration oil is a polyvinylether, a polyol ester or a polyalkylene glycol.

4. The compressor according to claim 1, wherein the refrigeration oil contains no extreme pressure additive.

5. A compressor, comprising:
a compressing mechanism unit comprising: a piston and a vane in a cylinder,
the vane including a nitrided steel as a base material; and
a CrN or DLC film formed on a surface of the base material by PVD treatment; and
the piston material including a Ni—Cr—Mo cast iron;
wherein the compressor uses a refrigerant containing a hydrofluoroolefin having a carbon-carbon double bond as a base component as its operating refrigerant, and a refrigeration oil miscible with the refrigerant.

6. The compressor according to claim 5, wherein a thickness of the CrN or DLC film formed on a tip region of the vane by PVD treatment is 5 to 15 μm.

7. The compressor according to claim 5, wherein the film is formed only on a tip region of the vane by PVD treatment.

8. The compressor according to claim 5, wherein the operating refrigerant comprises a mixed refrigerant containing a hydrofluoroolefin having a carbon-carbon double bond as the base component and a hydrofluorocarbon having no double bond.

9. The compressor according to claim 5, wherein the refrigeration oil contains no extreme pressure additive.

10. A compressor, comprising:
a compressing mechanism unit having a motor in a tightly sealed container and a shaft driven by the motor installed therein;
the compressing mechanism unit having bearings at both terminal faces of a cylinder, a piston eccentrically rotated by the shaft in the cylinder, and
a vane dividing the cylinder to suction and compression chambers, a tip region of which is in contact with a peripheral surface of the piston under pressure, the vane including a nitrided steel as a base material and a CrN or DLC film formed on a surface of the base material by PVD treatment, and
the piston material including a Ni—Cr—Mo cast iron;
wherein the compressor uses a refrigerant containing a hydrofluoroolefin having a carbon-carbon double bond as a base component as its operating refrigerant, and a refrigeration oil miscible with the refrigerant.

11. The compressor according to claim 10, wherein a thickness of the CrN or DLC film formed on the tip region of the vane by PVD treatment is 5 to 15 μm.

12. The compressor according to claim 10, wherein the film is formed only on the tip region of the vane by PVD treatment.

13. The compressor according to claim 10, wherein the operating refrigerant comprises a mixed refrigerant containing a hydrofluoroolefin having a carbon-carbon double bond as the base component and a hydrofluorocarbon having no double bond.

14. The compressor according to claim 10, wherein the refrigeration oil contains no extreme pressure additive.

* * * * *